Sept. 9, 1958     M. ENGELMANN     2,850,944
STEREOMICROSCOPE WITH OVERHEAD ILLUMINATION
Filed Jan. 15, 1957
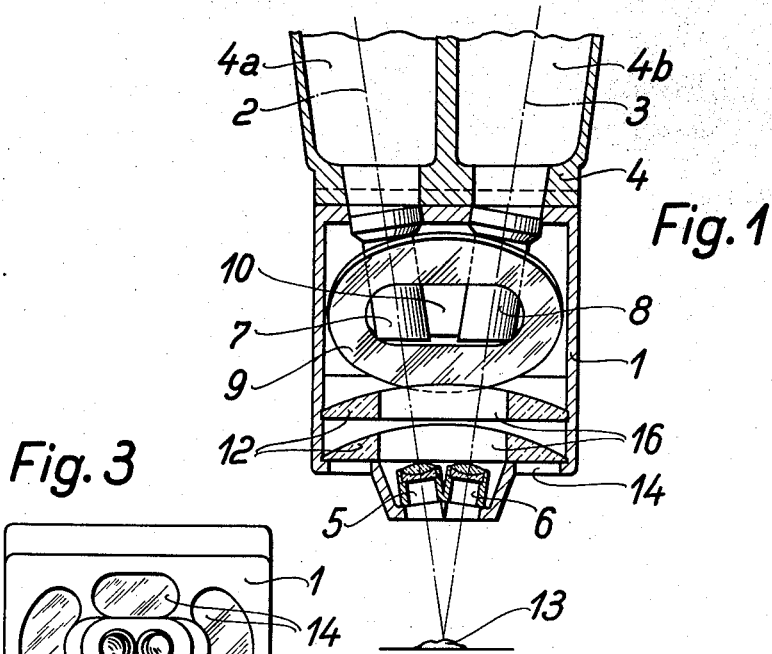
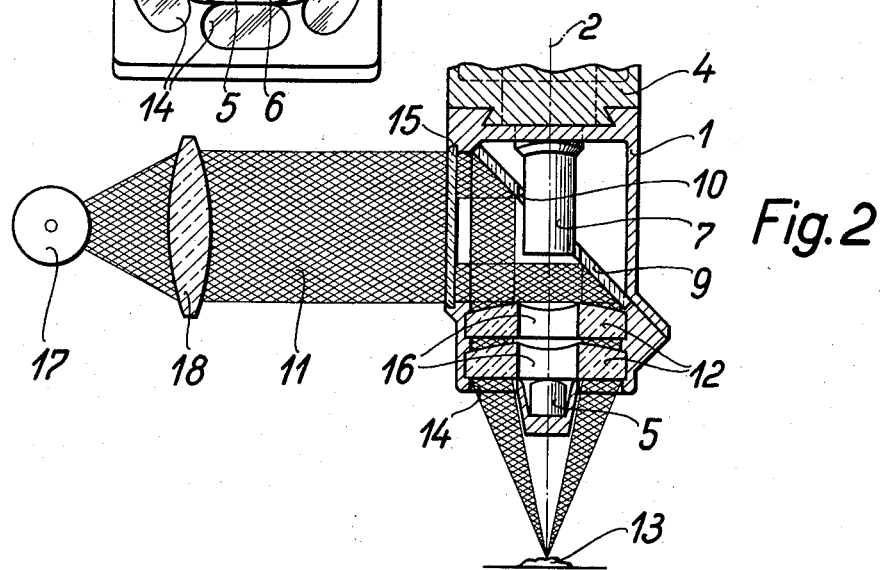
Max Engelmann INVENTOR.

United States Patent Office 2,850,944
Patented Sept. 9, 1958

2,850,944

STEREOMICROSCOPE WITH OVERHEAD ILLUMINATION

Max Engelmann, Wetzlar, Germany, assignor to Ernst Leitz, G. m. b. H., a corporation of Germany Application January 15, 1957, Serial No. 634,370

Claims priority, application Germany February 6, 1956

1 Claim. (Cl. 88—39)

This invention relates to improvements in stereomicroscopes in which the object is examined under overhead illumination. The object of the invention is to provide an improved illumination system for stereomicroscopes whereby to provide for even illumination of all portions of the surface of the object.

Prior devices or arrangements for this purpose do not, or may not, provide even illumination of the entire surface of an object. For example, it has been proposed to illuminate the object by means of lamps which were placed close to the object and supported on the microscope or separate therefrom. No optical elements were interposed between the lamps and the object. As a consequence it was impossible to illuminate evenly all portions of the surface of an object, particularly if the surface was strongly corrugated or uneven so as to form depressions which might be in the shade or shaded to such an extent that portions of the object surface could be examined only partly or not at all.

This invention, therefore, provides an overhead illumination system for stereomicroscopes whereby the surface of the object is evenly illuminated and the disadvantages of prior systems eliminated. The invention is embodied in a stereomicroscope provided with two observation tubes and two objectives, and in which the beam of illuminating light is directed towards an oval ringformed mirror which reflects the light to the object through a condenser lens system placed between the mirror and the object. The ringformed mirror is positioned at an angle of forty five degrees to the plane of the optical axes of the two observation tubes. The light source and a condenser lens may be supported on the microscope or may be separate therefrom.

Accordingly the invention is embodied in an overhead illumination device for stereomicroscopes arranged and constructed as hereinafter set forth and claimed and as illustrated in the accompanying drawing in which Fig. 1 is a front sectional view of the objective carrier of a stereomicroscope showing the illumination system.

Fig. 2 is a central vertical sectional view of the device shown in Fig. 1.

Fig. 3 is a detail view of the bottom of the objective carrier housing.

The system is contained within the objective carrier housing 1 which is mounted on the bottom plate 4 of the two observation tubes 4a and 4b, a dovetailed guide being used as shown in Fig. 2. The housing 1 supports the oval ringformed reflecting mirror 9 which has a central aperture at 10. The mirror is placed at an angle of forty five degrees to the plane of the converging observation axes 2 and 3 which pass through the observation tubes 4a and 4b down through the mirror aperture 10, thence through the objectives 5 and 6 to the object 13. Tubes 7 and 8 to exclude interfering light are supported in the housing 1 in the axes 2 and 3 and extend downward through the aperture 10 in the mirror as shown. A condenser lens system 12 is supported in the housing 1 below the mirror 9. The condenser system has a central opening at 16 for the passage of the observation beams of light along the axes 2 and 3.

The illuminating light rays 11 come from a suitable source of light 17 with a condenser 18 as shown and the light rays are directed towards the mirror 9 which reflects the rays downward through the condenser system 12 and openings 14 in the housing 1 to the object 13, Fig. 2.

That side of the objective carrier housing 1 which faces the light source 17 is formed of a glass plate 15. The central portion of the glass plate, corresponding to the aperture in the condenser lens 18, is blackened to exclude unwanted light.

The operation of the device or system described and illustrated herein will be understood by those skilled in the art and requires no further discussion.

I claim:

In a stereomicroscope having two converging observation tubes, a unitary device adapted to be detachably secured to the stereomicroscope to provide even overhead illumination from an outside source of light to an object to be examined, said unitary device comprising a housing containing and supporting a plurality of optical elements consisting of a light reflecting mirror, a condenser lens system below said mirror and two objectives below said condenser lens system, one objective for each observation tube in optical axial alinement therewith, said reflecting mirror and said condenser lens system each having a centrally disposed oblong opening, said mirror forming an angle of forty five degrees with the plane of the converging optical axes of the observation tubes to reflect light from an outside source of light downward through the condenser lens system to the object to illuminate the latter, two tubes to exclude interfering light supported in said housing and surrounding the converging axes of the observation tubes, said interfering light excluding tubes passing through the said oblong opening in said mirror and terminating immediately below the opening, said housing including means in its uppermost wall to engage cooperating means on the stereomicroscope for detachably securing the housing thereto, said housing having means on one side for admitting light from the outside source of light, the converging optical axes from the observation tubes passing through said light excluding tubes and through the said opening and through the two objectives to the object, said housing being of substantially cube formed formation to contain and support all of the aforesaid optical elements, the bottom wall of said housing supporting said objectives and having a plurality of openings spaced peripherally about the objectives to transmit the light from the said condenser lens system to the object.

References Cited in the file of this patent

UNITED STATES PATENTS

| | | |
|---|---|---|
| 1,840,448 | Heine | Jan. 12, 1932 |
| 1,935,444 | Heine | Nov. 14, 1933 |
| 2,097,762 | Heine | Nov. 2, 1937 |
| 2,130,493 | Heine | Sept. 20, 1938 |
| 2,143,632 | Ott | Jan. 10, 1939 |
| 2,357,378 | Benford | Sept. 5, 1944 |